May 13, 1941.　　　　P. E. MERCIER　　　　2,241,954
EXHAUST CONDUIT ARRANGEMENT FOR AIR-COOLED AIRCRAFT ENGINES
Filed June 28, 1939

INVENTOR
Pierre Ernest Mercier
BY
Pennie Davis Marvin & Edmonds
ATTORNEYS

UNITED STATES PATENT OFFICE 2,241,954

EXHAUST CONDUIT ARRANGEMENT FOR AIR-COOLED AIRCRAFT ENGINES

Pierre Ernest Mercier, Neuilly-sur-Seine, France

Application June 28, 1939, Serial No. 281,574
In Great Britain December 19, 1938

4 Claims. (Cl. 123—171)

This invention relates to cowlings for air-cooled aircraft engines, and is concerned with an improvement in or modification of a known cowling for air-cooled aircraft engines comprising two concentric conduits lying one within the other, the cooling air flowing through the inner conduit and, after passing over the surfaces to be cooled, being directed back through the outer conduit and thence to the atmosphere, wherein the concentric conduits are annular and the inner conduit adjacent to the inlet end thereof, diverges in the direction of the air flow therethrough, whilst the outer conduit, adjacent to the outlet end thereof converges in the direction of the air flow therethrough.

More particularly, this invention relates to an improvement in or modification of a cowling of the above type, in which exhaust members of the engine are disposed in front of the rear edge of the outlet aperture so as to ensure cooling thereof by the air which has already circulated over the fins of the engine.

According to the invention, the exhaust members extend directly into the outlet aperture. In this case, the gases of all the cylinders will preferably be guided by a curved trough which also acts as a blade to guide the cooling air and causes the gas and the cooling air to move in the same direction.

The partition separating the inlet and outlet spaces may have a projection situated between the exhaust conduits and intended to direct fresh air on to the forward upper part of the cylinder.

Figure 1:
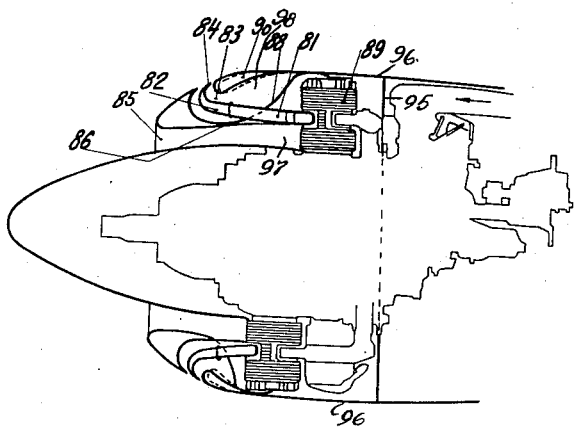
Figure 3:
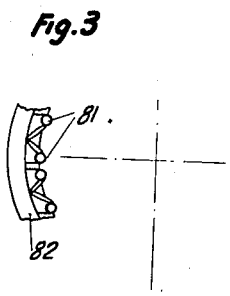
Figure 2:
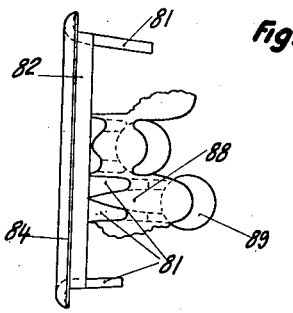
Figure 4:
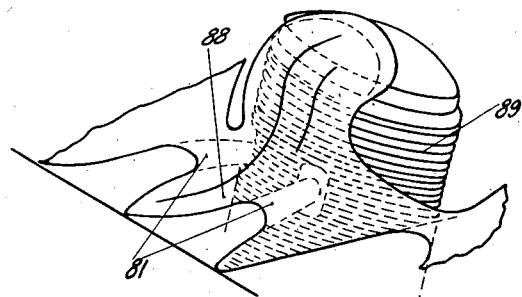

A convenient arrangement according to the invention will now be described, by way of example, and with reference to the accompanying drawing, in which:

Figure 1 is a view, partly in section of an aircraft engine, provided with a cowling according to the invention, Figures 2 and 3 are sectional views of parts of the cowling shown in Figure 1, and Figure 4 is a perspective view of part of the engine shown in Figure 1.

In the arrangement which is shown somewhat diagrammatically in Figures 1 to 4, a cowling 96 according to the invention is applied to a valveless engine having two forwardly extending exhaust conduits 81 provided for each cylinder.

The exhaust conduits 81 extend in progressively flattened form into a curved trough 82 which is disposed in the cooling air conduit 83, and has, level with the discharge slot of the conduit 83, a gas discharge slot 84 disposed in the direction of flow of the cooling air.

The cross section of this trough is such that it acts as a blading for guiding the cooling air flowing along either side thereof. The cooling air enters through an annular inlet aperture 85.

A cylindrical partition 86 is provided for limiting the forward and backward flow of the air through the cowling 96. This partition may, as is shown most clearly in Figure 4, have a projection 88 extending between the two exhaust conduits 81 of each cylinder, and acting to direct fresh air on to the upper forward part of the cylinder 89 and, if necessary, to the interior of the cylinder head. The cylindrical partition 86 divides the space in the cowl into two annular concentric conduits, an internal conduit 97 and an external conduit 98. The partition 95 closes the cowl behind the cylinders and serves to return the cooling air toward the front through the external conduit.

The outlet slot is regulated by displacement of the rear edge 90 of the discharge slot, the displaced position of this slot being shown in dotted lines. The mechanism for effecting the displacement has been omitted for the sake of simplicity, and it is to be understood that such mechanism may be of any desired nature.

What I claim is:

1. An air-cooled aircraft motor comprising a cowl closed with the exception of two annular concentric openings at the front, an interior partition dividing the space between the said openings and the cylinders of the motor into two concentric conduits each terminating on the one side at one of the said openings and, on the other side, at the cylinders, means for distributing the air over the cylinder surfaces to be cooled, a partition closing the cowl behind the cylinders to return the air toward the front through the external conduit after its passage over the said surfaces, and exhaust pipes for the said cylinders, the said exhaust pipes extending forwardly and terminating in an outwardly and rearwardly curved end portion having an evacuation opening located in the exit opening of the said external conduit so that exhaust gases emitted from said exhaust pipes will be discharged into the air in the general direction in which the air flows over the cowl.

2. An air-cooled aircraft motor comprising a cowl closed with the exception of two annular concentric openings at the front, an interior partition dividing the space between the said openings and the cylinders of the motor into two concentric conduits each terminating on the one side at one of the said openings and, on the other side at the cylinders, means for distributing the air over the cylinder surfaces to be cooled, a partition closing the cowl behind the cylinders to return the air toward the front through the external conduit after its passage over the said surfaces, and exhaust pipes for the said cylinders, the said exhaust pipes progressively flattening out in the form of a pipe curved outwardly to an evacuation opening located in the exit opening of the said external conduit, the section of the said pipes being formed to guide the cooling air at its exit in the same general direction as the exhaust gases of the motor.

3. An air-cooled aircraft motor comprising a cowl closed with the exception of two annular concentric openings at the front, an interior partition dividing the space between the said openings and the cylinders of the motor into two concentric conduits each terminating on the one side at one of the said openings and, on the other side, at the cylinders, means for distributing the air over the cylinder surfaces to be cooled, a partition closing the cowl behind the cylinders to return the air toward the front through the external conduit after its passage over the said surfaces, and exhaust pipes for the cylinders, the said exhaust pipes progressively flattening out in the form of a pipe curved outwardly to an evacuation opening situated in the exit opening of the said external conduit, the section of the said pipes being formed as a blade for guiding the cooling air at its exit in the same general direction as the exhaust gases of the motor, and the two exhaust pipes of each cylinder being connected together by a part of the said internal partition, and thus intercalated in this partition which they complete.

4. In an aircraft, the combination of an air-cooled engine, a cowling enclosing said engine, means for evacuating cooling air near the front end of said cowling and on the front side of said engine, means for admitting cooling air to said cowling in a direction to flow over said engine to cool the same, the flow of the cooling air toward said evacuation means being in a direction from the rear of the cowling and engine to the front thereof, exhaust pipes extending forwardly from the engine cylinders to and terminating at said evacuating means, the forward portions of said pipes being flattened and reversedly curved to form flattened exhaust conduits for exhausting the products of combustion from the engine and for guiding the cooling air at said evacuating means in a generally rearward direction.

PIERRE ERNEST MERCIER.